United States Patent
Smith

(10) Patent No.: US 7,878,302 B2
(45) Date of Patent: Feb. 1, 2011

(54) LUBRICATION ARRANGEMENT FOR A BEARING

(75) Inventor: Paul A Smith, Derby (GB)

(73) Assignee: Rolls-Royce, PLC, London (GB)

( * ) Notice: Subject to any disclaimer, the term of this patent is extended or adjusted under 35 U.S.C. 154(b) by 634 days.

(21) Appl. No.: 11/434,196

(22) Filed: May 16, 2006

(65) Prior Publication Data
US 2007/0137932 A1    Jun. 21, 2007

(30) Foreign Application Priority Data
Jun. 10, 2005    (GB) .................................. 0511788.2

(51) Int. Cl.
*F01D 25/18* (2006.01)
(52) U.S. Cl. ................................................. 184/6.11
(58) Field of Classification Search .............. 184/6, 184/6.11, 65, 103.1
See application file for complete search history.

(56) References Cited

U.S. PATENT DOCUMENTS

| | | | |
|---|---|---|---|
| 3,147,821 A | * | 9/1964 | Eggenberger ............... 184/109 |
| 3,563,344 A | * | 2/1971 | Veller et al. ..................... 184/6 |
| 4,717,000 A | * | 1/1988 | Waddington et al. ......... 184/6.1 |
| 5,911,678 A | | 6/1999 | White |

FOREIGN PATENT DOCUMENTS

| GB | 2 133 481 A | 7/1984 |
|---|---|---|
| JP | A-2000-087718 | 3/2000 |

* cited by examiner

*Primary Examiner*—Robert A Siconolfi
*Assistant Examiner*—Vu Q Nguyen
(74) *Attorney, Agent, or Firm*—Oliff & Berridge, PLC

(57) ABSTRACT

A lubricant arrangement is provided for multiple feed pipes to bearings lubrication system. In order to ensure a feed pipe remains substantially full of lubricant fluid, a drainage restrictor configuration is provided. This configuration typically comprises an anti siphon tube, accumulator, a fluid head between a supply pipe and the feed pipe as well as a final loop in the feed pipe formed by limbs. In such circumstances, drainage of lubricant fluid from other feed pipes for other bearings does not siphon lubricant fluid from the feed pipe which may be subject to potential coking as a result of high temperatures and air.

11 Claims, 9 Drawing Sheets

LUBRICATION ARRANGEMENT FOR A BEARING

The present invention relates to bearing arrangements and more particularly to potential oil coking in the lubrication system for the bearing arrangement after shut down of an engine incorporating the bearing arrangement.

It is known to use bearings in a wide range of engineering situations. Bearing arrangements are used in gas turbine engines in order to support the rotary shafts of the engine. It will be understood in order to provide an effective bearing arrangement it is necessary to lubricate the bearing arrangement appropriately. This lubrication generally takes the form of lubricant oil splayed or otherwise presented to the bearing arrangement through appropriate feed and supply pipes. Generally, the oil is pumped towards the bearing arrangement and then through appropriate scavenge tubes recovered to a filter before being re-presented to the bearing arrangement in a lubrication cycle.

Some bearing arrangements are subject to excessive heat such that at times of shutdown this heat remains whilst the oil, now without pumping pressure, drains back to a sump or nose point in the lubrication system. In such circumstances, the oil can react with air in the high temperature environment in order to create coke particularly if there is a relative high exposed surface area of lubricant to volume. It will be understood that a bearing arrangement experiencing coke formation results in coke debris migrating towards and possible partially blocking oil scavenge tubes and pipes as well as other parts of the arrangement. Coking leads at least to oil loss and potential reduction in lubrication capacity. In such circumstances it is necessary to perform unscheduled repair upon machinery incorporating such bearing arrangements as well as possible premature replacement of parts as a result of the debris and overheating conditions.

Essentially, as part of the draining process, it will be understood that a film of oil with high surface area to volume is retained upon the pipes and as a result the mixture of air and excess heat upon that film creates coke through a coking process. It will be understood in normal operations the pipes and tubes are full of lubricant under pressure and therefore coking does not occur.

In accordance with the present invention there is provided a lubrication arrangement for a bearing, the arrangement comprising a flow pipe having an outlet for presentation of a forced lubricant fluid flow, or for scavenging of lubricant fluid, the arrangement characterised in that there is a drain restrictor associated with the flow pipe and the flow pipe is positioned to provide a lubricant fluid retainer for the outlet.

Typically, the drain restrictor includes an accumulator in the flow pipe to provide a lubricant fluid reserve.

Typically, the accumulator provides a fluid head for the lubricant fluid retainer. Generally, the flow pipe has a restrictor valve.

Typically, the lubricant fluid retainer comprises a loop whereby lubricant is retained in balance across the arc of the loop to the outlet. Generally, the accumulator is located above the height of the outlet. Typically, the accumulator sustains forced lubricant fluid flow after removal of any normal pressurizing means for that fluid flow.

Generally, the drain restrictor includes an anti-siphon tube to prevent siphon and/or drawback of fluid from the pipe by drainage of other flow pipes or tubes in a lubricant arrangement for a bearing. Generally, the anti siphon tube is coupled to an opening to the accumulator and includes a restrictor to prevent lubricant fluid drainage through the anti siphon tube whilst allowing air to enter the accumulator.

Generally, a supply pipe for the flow pipe is arranged to supply lubricant fluid with a fluid head above the height of the outlet. Advantageously, the anti-siphon pipe is coupled to the supply pipe at a supply height for the pipe.

The present invention also incorporates a lubrication system for a bearing comprising a lubrication arrangement as described above associated with lubrication pipes for other bearings whereby a pump provides the forced lubricant fluid flow and the drain restrictor acts between the flow pipe and other pipes for other bearings to isolate the pipe from siphon drainage.

Embodiments of the present invention will now be described by way of example and with reference to the accompanying drawings in which.

As indicated above, provision of pressurized lubricating fluid or oil to a bearing is known. Generally, the oil is pressurized for presentation through feed flow pipes whilst an engine or other machinery is running. The oil cools and lubricates the bearing before being scavenged for return to the oil tank, etc., generally through the flow pipes. During shut down oil in the feed pipe is generally siphoned back to the lowest point in the system. In such circumstances, lubricating fluid or oil will flow in the opposite direction to the pressurizing system. Such an approach leaves a film of oil on the flow pipe, which in view of the presence of air and high temperatures can result in coking and subsequent problems with respect to blockage and loss of lubricating oil capacity.

Figure 1:
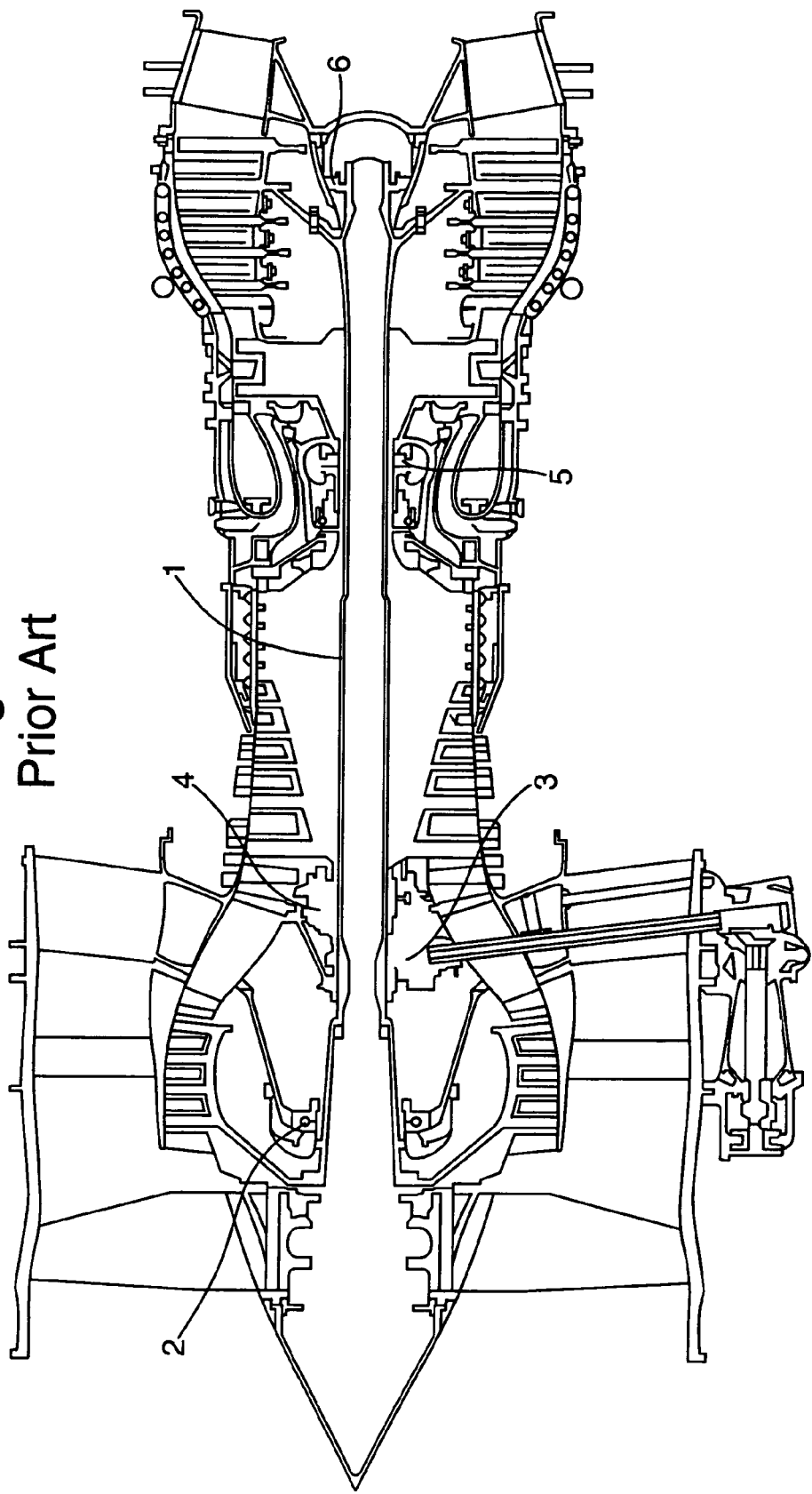
FIG. 1 is a cross-section of a typical turbine engine incorporating bearings.

FIG. 1 illustrates a gas turbine engine in which as can be seen, a shaft 1 is supported upon a number of bearings 2, 3, 4, 5, 6. These bearings 2-6 generally all receive forced flow lubricating fluid by appropriate feed flow pipes and tubes, and as indicated above, upon shut down this lubricating fluid will generally under the action of gravity drain to the lowest point. It will also be understood that with interconnected flow pipes there will be siphoning effects with respect to lubricating fluid drainage from one flow pipe to a particular bearing acting to create a flow pressure drawing lubricating fluid from other flow pipes in a substantially closed lubrication system.

As indicated above, generally the presence of air and high temperatures will result in potential problems with regard to lubricating fluid or oil coking. In such circumstances, bearing 6 in the engine depicted in FIG. 1 will be subject to high temperatures as well as air being present in the flow pipe to that bearing 6 such that there is a higher potential for coking. Nevertheless, upon shut down, the other bearings 2 to 5 will tend to act through a siphoning effect to draw oil from the bearing 6 to leave a film, which as indicated will be subject to higher potential problems with respect to coking.

Figure 2:
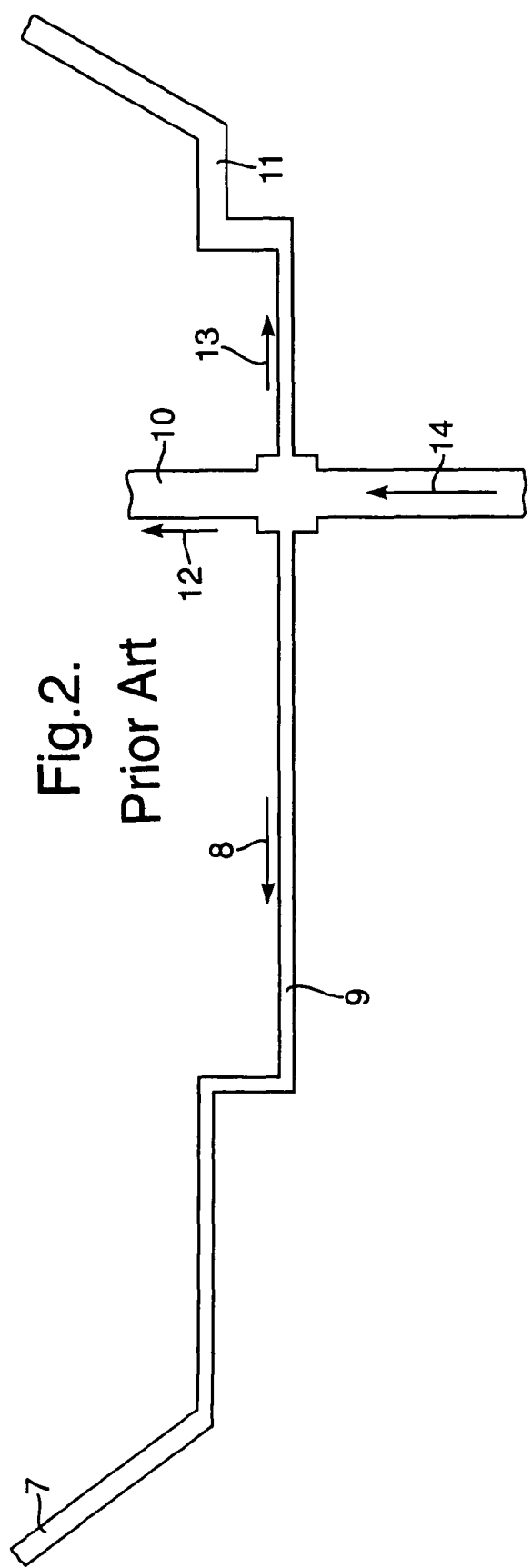
FIG. 2 is a schematic illustration of a prior lubrication arrangement for a bearing.

FIG. 2 provides a schematic illustration of such prior arrangements in which an outlet or opening 7 for the bearing 6 (FIG. 1) receives a supply of lubricating oil in the direction of arrowhead 8 through a feed flow pipe 9. Other jets for other bearings 2-5 are supplied through respective feed flow pipes 10, 11 with lubricating fluid or oil in the direction respectively of arrows 12, 13. It will be understood that these flows 8, 12, 13 are driven by an appropriate pumping mechanism (not shown) to give a main lubricating fluid supply flow in the direction of arrowhead 14. In such circumstances it will be appreciated that the pump or sump is the lowest point in the system and therefore once the pumping mechanism is shut down there is a gradual drainage under gravity in the opposite direction to arrowheads 8, 12, 13, 14. Oil is removed (scavenged) from and through the outlet or opening 7 but a film or surface coating of oil will remain on the outlet and feed flow pipe 9. With high elevated temperatures and with air now in the feed flow pipe 9, there will be a degree of coking of the lubricating oil resulting in a reduction in the amount of lubricating oil in the system as well as potential problems with respect to choking or even blockage of the feed flow pipe 9.

Figure 3:
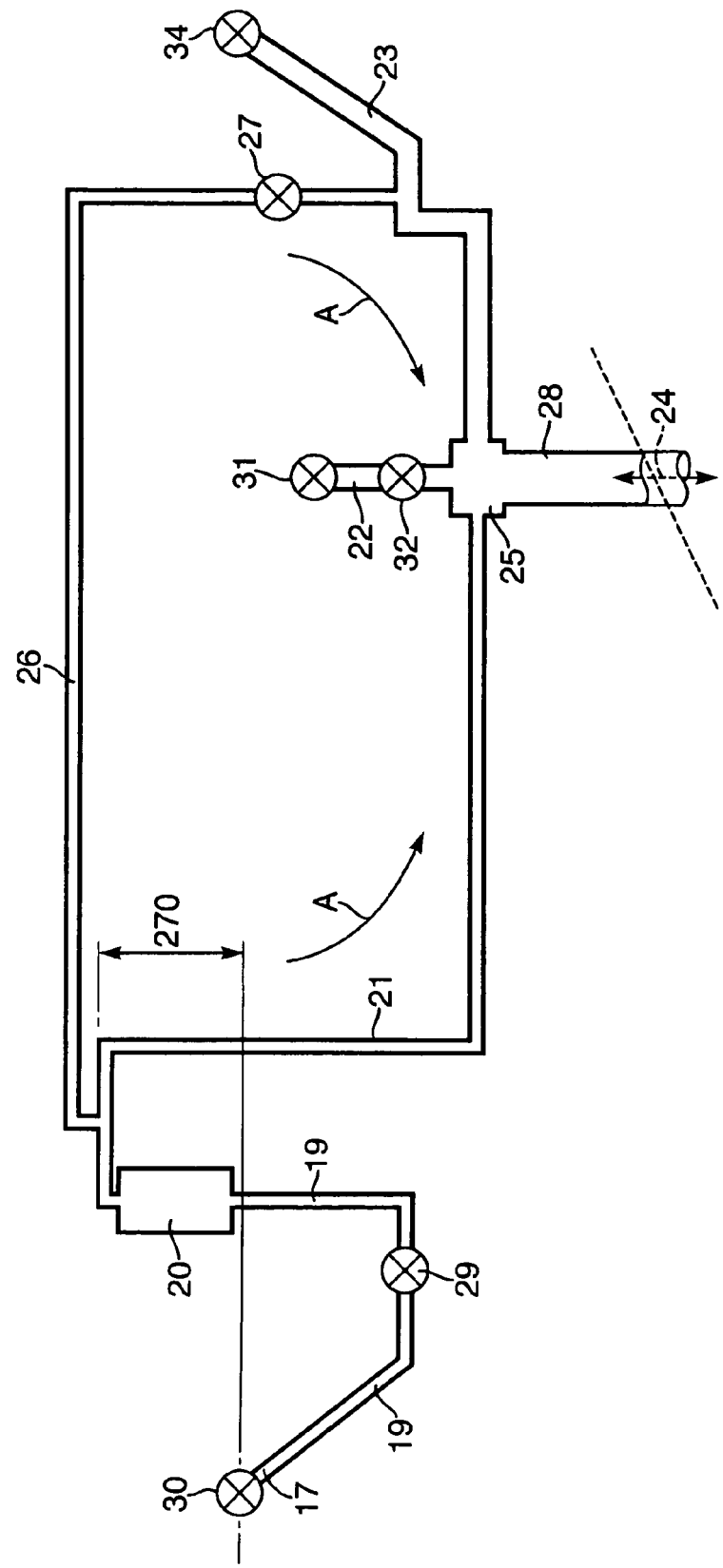
FIG. 3 is a schematic illustration of a lubrication arrangement for a bearing in accordance with the present invention.

In order to reduce coking, it is desirable to maintain a body of lubricating fluid in the flow pipe rather than allow that fluid to be drawn and drained back into the lowest point sump. FIG. 3 provides a schematic illustration of a lubrication arrangement for a bearing in accordance with the present invention. Thus, an outlet or outlet 17 for presentation of lubricant fluid is provided at the end of a flow pipe 19 which in turn is fed through an accumulator 20 and a supply pipe 21. In such circumstances, in operation lubricant fluid passes along the supply pipe 21 under pressure generated at and by a pumping mechanism through the flow pipe 19 and out of the outlet 17. As previously, a main lubricant fluid flow 24 is presented to a distributor manifold 25 whereby the lubricant fluid as indicated is supplied to the flow pipe 19 as well as other pipes 22, 23 for other bearings. In the embodiment depicted in FIG. 3, an anti siphon tube or pipe 26 is provided between the flow pipe 19 and the other feed pipe 22, 23 for other bearings.

Operation of the present lubrication arrangement will be described more particularly below with reference to FIGS. 4 to 10, but in principal during normal operation the forced lubricant flow will pass through the pipes 19, 21, 22, 23 in order to maintain a lubricating pressure in the bearings as required for operation. However, upon removal of this forcing pressure for the lubricant flow, the lubricating arrangement will naturally drain under gravity to the lowest point. In such circumstances, the present lubrication arrangement is designed in order to maintain lubricant fluid in the flow pipe 19 in order to inhibit coking. It will be understood during drainage generally there will be a tendency for lubricant fluid to flow in the direction of arrowheads A. In such circumstances, in accordance with the present invention the lubrication arrangement is designed to ensure that the supply pipe 21 creates a loop which is generally above in order to create a fluid head 270 above the opening 17 of the flow pipe 19.

It will be appreciated by providing the supply pipe 21 such that it has a fluid head 270 above the outlet 17 ensures that problematic siphoning effects can be avoided. There is a lubricant balance in the limbs created by the loop of the supply pipe 21 on one side and the flow pipe 19 and accumulator 20 on the other side. A restrictor 27 is provided in the anti siphon tube 26 such that the drainage flow through the pipe 23 does not create a siphoning draft as it passes through a main supply tube 28. Essentially the restrictor 27 equalises pressure between the supply pipe at the top of the fluid head 270 and that passing through the pipe 23 and main pipe 28 such that there is no or very limited siphoning effects.

In the above circumstances, the present invention provides a drainage restrictor which typically comprises both the anti siphon tube as well as the accumulator 20 and fluid head 270 such that a body of lubricating fluid is retained in the flow pipe 19 end throughout and subsequently during relaxed shut down of the lubrication arrangement.

The accumulator 20 is designed to store a volume of lubricating fluid. Typically, this lubricating fluid is flowing through the accumulator 20 whilst the bearing is operational in an active engine. In short, the accumulator 20 ensures that there is excess capacity in the flow pipe 19. As will be described later, this excess capacity provides the facility for ongoing fluid flow subsequent to engine shut down for additional cooling effect with respect to the flow pipe 19 avoiding coking of a stagnant lubricating oil in the flow pipe 19 during the early stages of engine shutdown. On shut down, that is to say depressurisation of the lubrication system, the stored volume and lubricating oil is released into the pipes 19, 21. This lubricating oil acts as a balance volume to ensure lubricating oil remains within the flow pipe 19.

Typically, a restrictor 29 is provided in the loop created by the flow pipe 19. This restrictor 29 restricts oil flow through the outlet 17 in view of the potential adverse effects of additional lubricant flow rate from the accumulator 20 and via the anti siphon tube 26.

As indicated above, the anti siphon tube 26 is designed to prevent siphoning through introduction of air eventually into the supply pipe 21, accumulator 20 and flow pipe 19.

It will be understood that other restrictors 30, 31, 32, 34 will also generally be provided in order to maintain fluid pressure distribution in the lubrication arrangement during normal engine operation. The restrictors 30, 31, 32, 34 will be achieved through constriction in the pipe work or through provision of oil jets at the end of the pipe work as depicted.

FIG. 3 provides the basic schematic layout of a lubrication arrangement in accordance with the present invention including the accumulator 20. However, as indicated, the accumulator 20 acts as a ballast lubricating fluid stored in the lubricating arrangement and the actual size of the accumulator 20 or whether an accumulator 20 is required at all is dependent upon the efficiency of the anti siphon tube 26 in preventing a siphon drawback of lubricating fluid from the flow pipe 19. Generally, the anti siphoning effect cannot be perfect and therefore it is necessary to provide a ballast accumulator 20 for stored lubricating oil in order to ensure lubricating oil remains within the flow pipe 19.

Figure 4:
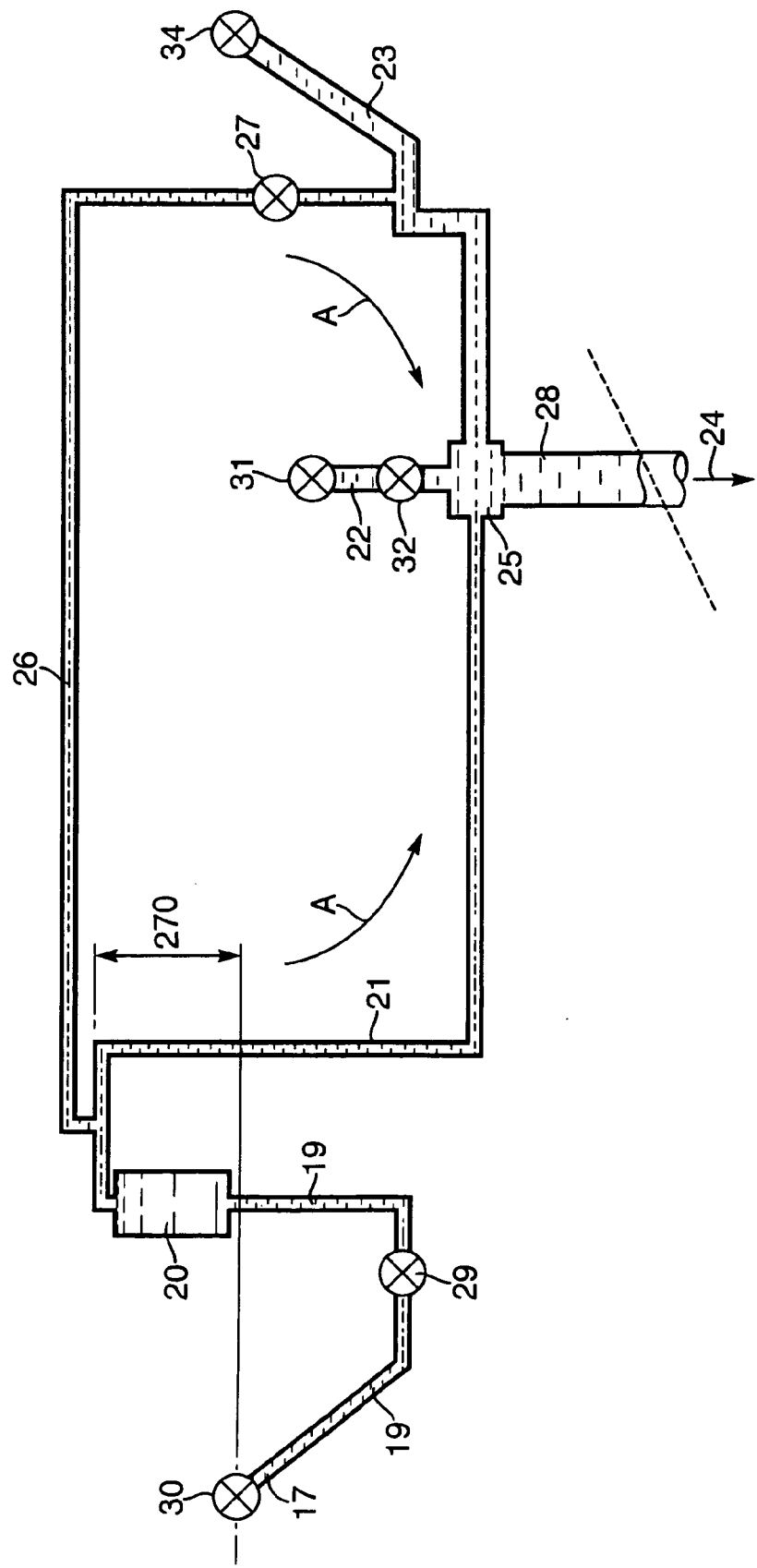
FIG. 4 is a schematic cross-section illustrating the lubrication arrangement depicted in FIG. 3 during normal operation.

FIG. 4 illustrates the lubricating arrangement depicted in FIG. 3 in a normal bearing operational status. Thus, as can be seen, lubricating oil is located throughout the whole arrangement. This condition is thus that present in the arrangement immediately upon shutdown of the pumping mechanism. In such circumstances upon immediate shut down of the pumping mechanism there is a gravitational effect urging fluid flow in the direction of arrowhead A to the lowest point in the system. This lowest point will tend to be a gearbox or sump. Control of this drainage urge in the direction of arrowheads A in order to maintain lubricating fluid in the flow pipe 19 is required by use of an appropriate drainage flow restriction.

It will be understood that the drainage urge or drawing effect is not immediate and generally the closer the pipe to the lowest point in the arrangement and its size will be determinant as to the rate of drainage of that pipe to the lowest point in the system. Furthermore, the natural pressurizing effect of the pumping mechanism will initially reduce the lubricating fluid level in all the flow pipes 19, 22, 23. However, after a short time period of a few seconds after shut down, a top level 35 of the draining lubricating fluid reaches the end of the anti siphon tube 26 at its junction with the feed pipe 23. At this point, air from the pipe 23 is then introduced into the anti siphon tube 26. This air passes across the anti siphon tube 26 to the junction of the supply tube 21 and the flow pipe 19 for the outlet 17.

Figure 5:
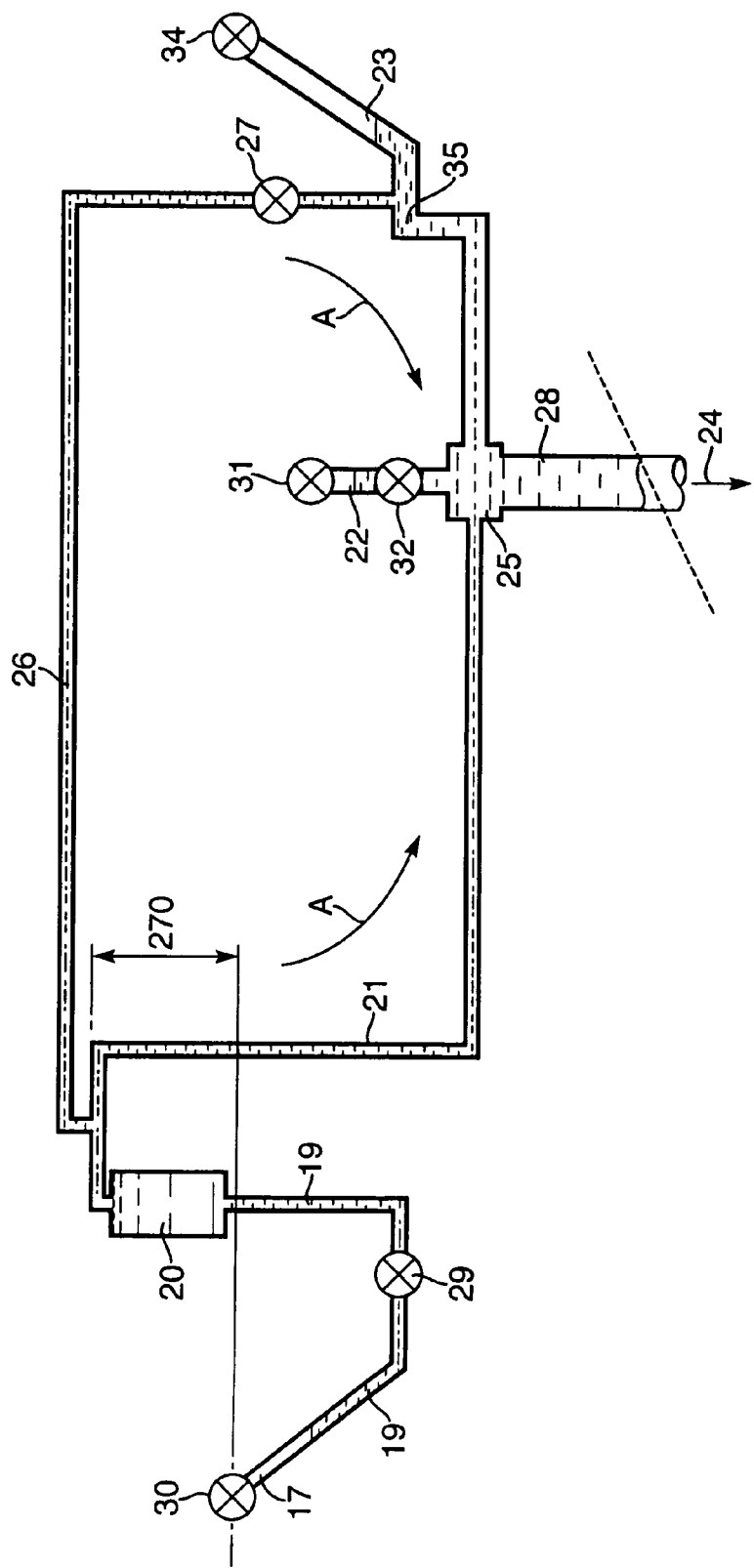
FIG. 5 is a schematic illustration of the lubrication arrangement depicted in FIGS. 3 and 4 during a first stage of shut down.
Figure 6:
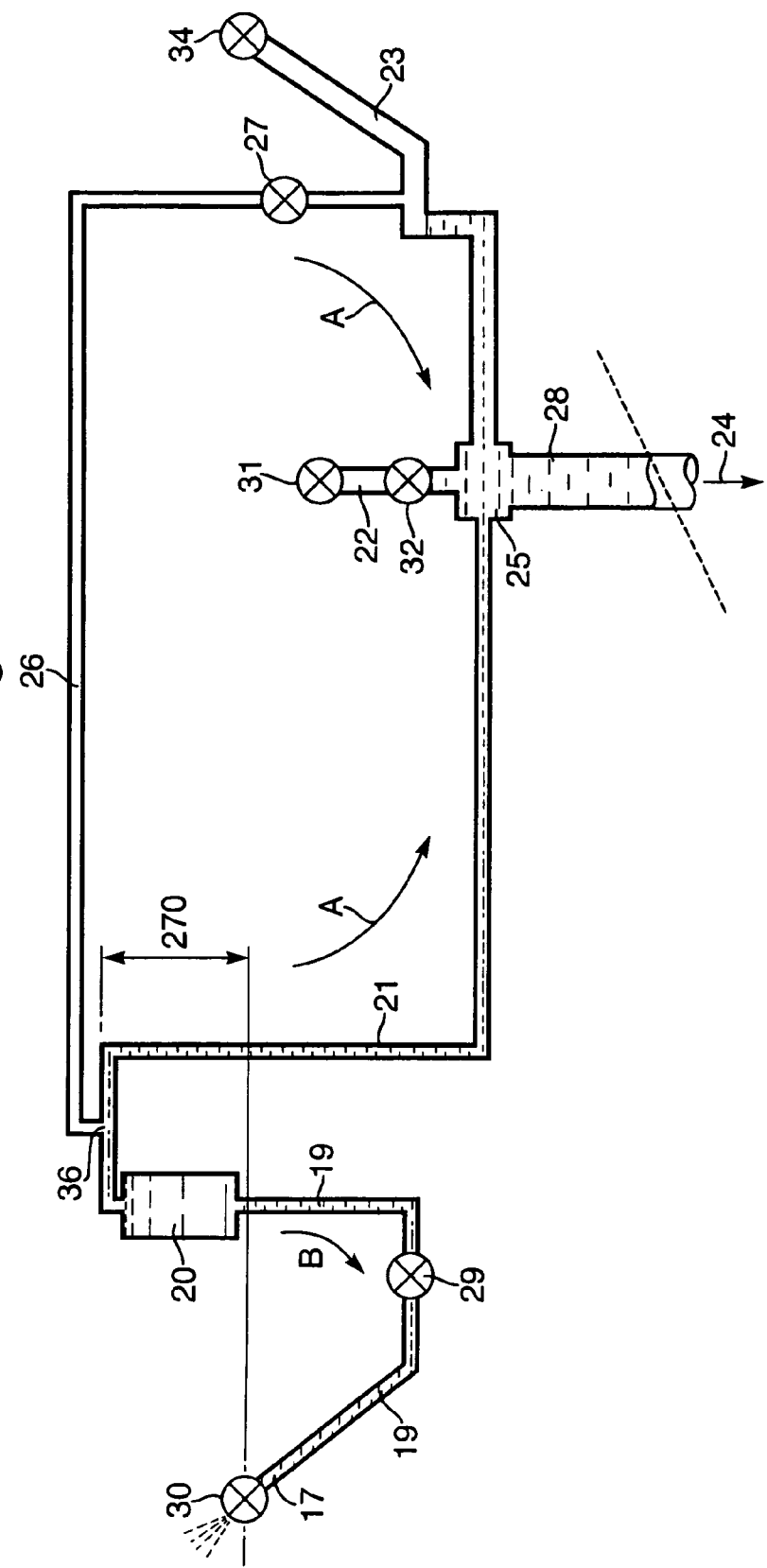
FIG. 6 is a schematic illustration of the lubrication arrangement depicted in FIGS. 3 to 5 at a second stage of shut down.

This siphoning of the air along the anti siphon tube 26 is relatively rapid such that after a few seconds the initial air siphoning effect described with respect to FIG. 5 creates the lubrication arrangement state depicted in FIG. 6 in which air travels along the tube 26 such that fluid in passages 22, 23 can continue to drain back through the main supply pipe 28 to the lowest point in the system via the manifold 25. It will also be understood that the fluid head 270 created by the loop formed by the flow pipe 19 and supply tube 21 is now released such that lubricating fluid in the supply tube 21 will also flow back in the direction of arrowheads A to the manifold 25. In short, the air breaks the siphon at a top junction 36 between the pipes 19, 21 such that fluid balancing across the loop formed by the pipes 19, 21 will then necessitate flow in the direction of arrowhead A for drainage of the supply pipe 21, but also flow in the direction of arrowhead B through the flow pipe 19 in order to project a lubricant fluid flow out of the outlet opening 17.

Figure 7:
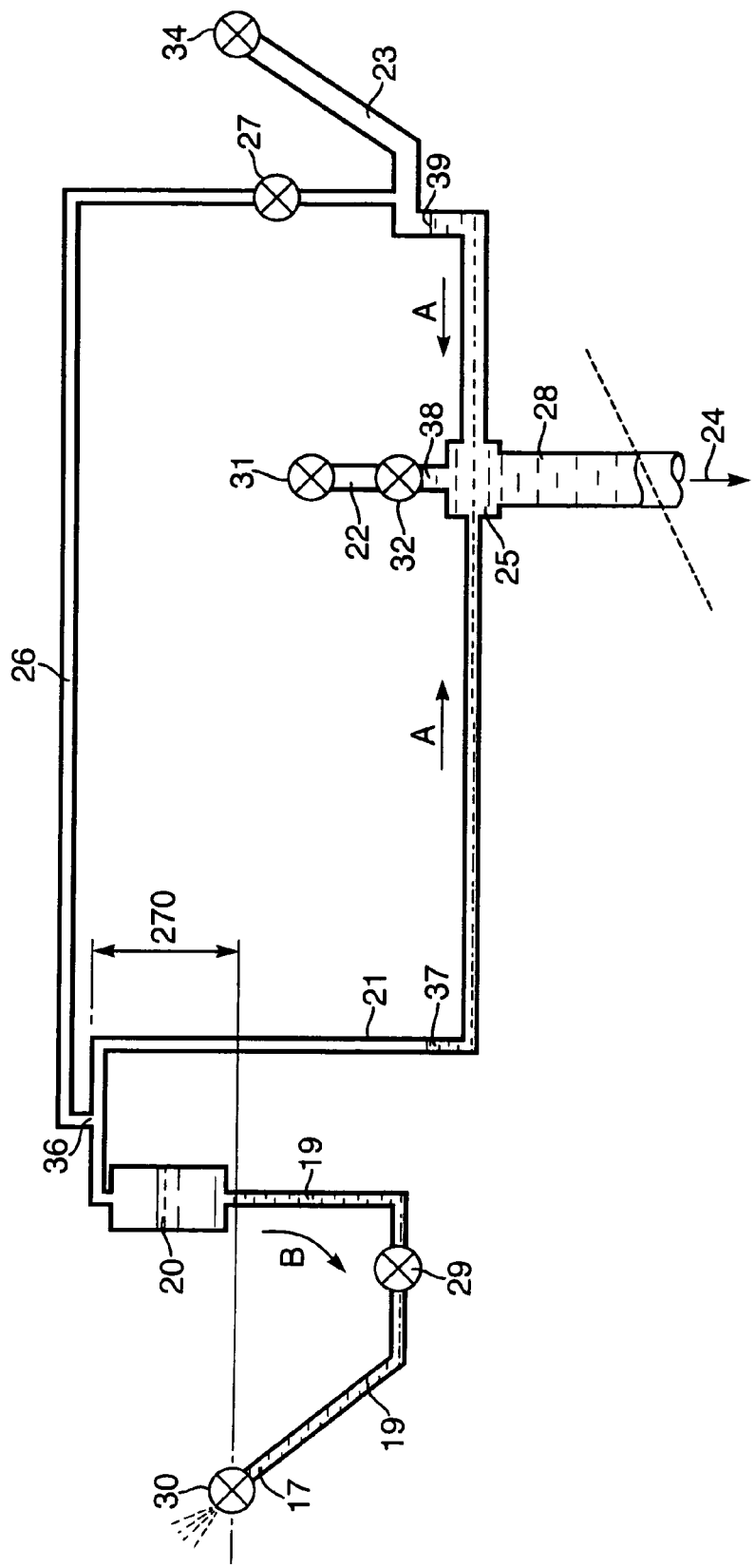
FIG. 7 is a schematic illustration of the lubrication arrangement depicted in FIGS. 3 to 6 during a third stage of shutdown.

It will be appreciated through gravitational drainage there will be a rapid drainage of lubricating fluid in the pipes 21, 22, 23 in order to establish a fluid level which is substantially equivalent in each pipe 21, 22, 23. Thus, as depicted in FIG. 7 with the air passing through the anti siphon tube 26, a fluid level 37, 38, 39 in each pipe 21, 22, 23 will be substantially equalised. Of more importance is the drainage through the flow pipe 19 from the accumulator 20. In such circumstances as indicated with regard to FIG. 6, the lubricating fluid will flow in the direction of arrowhead B and out of the outlet opening 17 until there is equalisation between the fluid level within the accumulator 20 or flow pipe 19 and that opening 17. All surplus lubricating fluid in the accumulator 20/flow pipe 19 will pass out through the outlet opening 17 unless required to fill the flow pipe 19. It will be appreciated that arrangements with an accumulator 20 are advantageous in order to maintain this post shut down lubricant fluid flow through the flow pipe 19 in order to provide cooling and resist coking of the lubricating fluid. It will be understood that the strength of the post shutdown fluid flow through the flow pipe 19 is substantially dependent upon the fluid head and also the capacity of the accumulator 20 in relation to the restrictor 29.

Figure 8:
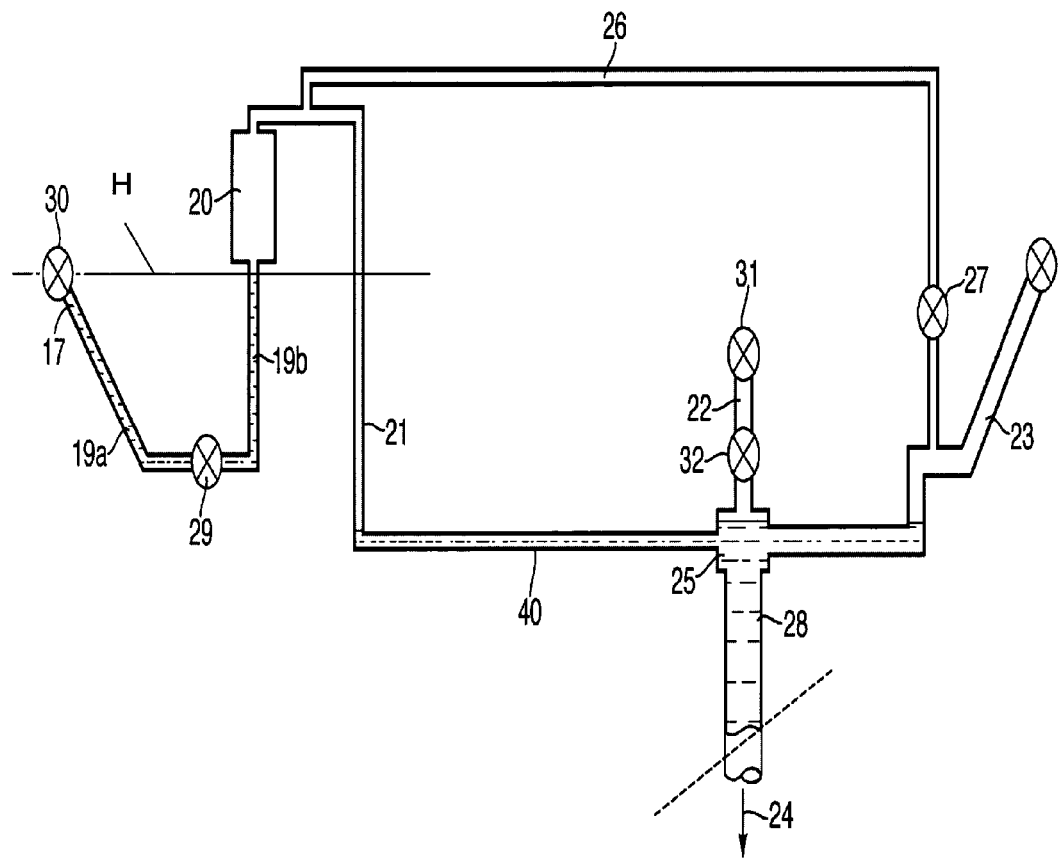
FIG. 8 is a schematic illustration of the arrangement depicted in FIGS. 3 to 9 at shut down rest.

As can be seen in FIG. 8, flow from the accumulator 20 continues until there is equalisation between the lubricant fluid level at the outlet opening 17 and a height H in the flow pipe 19. In short, the flow pipe 19 is arranged as a loop such that respective limbs 19a, 19b are filled with lubricant fluid with a fluid balance in each limb 19a, 19b at the height H. In such circumstances, a volume of lubricant fluid is retained in the flow pipe 19 and the prospects for coking are therefore diminished.

It will be noted in the remainder of the pipe network 21, 22, 23 lubricant fluid will still continue to drain in the direction of arrowhead 24 to the lowest point in the system. Nevertheless, in relatively small pipes of a 'flat' route/nature and through surface tension/capillary action, some lubricating fluid 40 may be retained.

Generally, the lubricant arrangement condition depicted in FIG. 8 will be that at shutdown rest so that there will be no further draining of the lubricant fluid and therefore lubricant fluid will be retained in the flow pipe 19.

It will be understood upon initial start up lubricant fluid will again be presented through the main supply tube and therefore an air pressure wave may be presented through the pipes 21, 22, 23 which will force the retained lubricant fluid in the limbs 19a, 19b out of the outlet opening 17 in an initial start up spurt. Nevertheless, in view of the nature of the pumping mechanism, lubricant will rapidly fill the accumulator 20 and flow pipe 19 as well as the other pipes 22, 23 in order to lubricate their respective bearings. In such circumstances, the initial spurt of lubricant fluid may be advantageous in providing initial lubricant protection for the bearing prior to ongoing normal operational supply of lubricant fluid.

It will be appreciated from the above that the present lubrication arrangement utilises a number of elements in order to provide a drainage restriction. These elements comprise the anti siphon tube 26, a lubricating fluid bias reserve created by the accumulator 20, the fluid head 270 created by the inverted loop with limbs comprising the supply pipe 21 and part of the flow pipe 19 and the loop formed by the respective limbs 19a, 19b in the flow pipe 19 prior to the outlet opening 17. Each one of these elements contributes to restricting drainage of the lubricant fluid in order to retain lubricant fluid in the flow pipe 19 prior to the opening.

It will be appreciated in a practical situation the lubrication arrangement must be accommodated within operational machinery. Typically, such operational machinery will have space constraints. With respect to gas turbine engines utilised for aircraft propulsion there will be a significant weight as well as space constraint upon design choices. Furthermore, it will be understood that each bearing may have a number of outlets in order to supply lubricating fluid during operation to that bearing. In such circumstances, the particular depth of the final loop created by the flow pipe limbs 19a, 19b, the size of the accumulator 20 along with its shape, the fluid head 270 created between the flow pipe 19 and supply pipe 21 as well as the route of the anti siphon tube 26 may all be adjusted in order to create the necessary drainage restriction in accordance with the invention tailored for particular engine operational requirements and constraints.

It will be appreciated that the present lubrication system is particularly applicable to situations where the lubrication system supplies a number of feed flow pipes for respective bearings, but where one feed flow pipe may be subject to particular problems with respect to coking or otherwise. In such circumstances, as describe above, generally the gravitational drainage of the lubrication fluid may create siphoning effects removing lubricating oil from the feed pipes susceptible to coking. By the present drainage restrictor such problems are avoided. It will also be understood that the present lubrication arrangement could be utilised in a number of machinery situations where it is necessary to retain a primed initial feeder flow pipe for a lubricant bearing.

Generally, the feed flow pipe described with regard to the present invention may also be a scavenge pipe where flow is provided in the opposite direction in terms of the forcing mechanism during normal machinery or engine operation. Thus, the scavenge pipe draws lubricant flow rather than feeds flow but other than possible with regard to any lubricant dwelling about the outlet to the feed scavenge pipe if sunken the principles of operation are the same as described with regard to FIGS. 4 to 8.

As indicated above, an advantage of the present arrangement is the ability to retain oil in the scavenge pipe for a longer period subsequent to engine shut down in order to prevent or at least inhibit coking in that scavenge pipe. It will be understood that replacement and maintenance of the scavenge pipe is a relatively complex procedure and therefore to be avoided.

Figure 9:
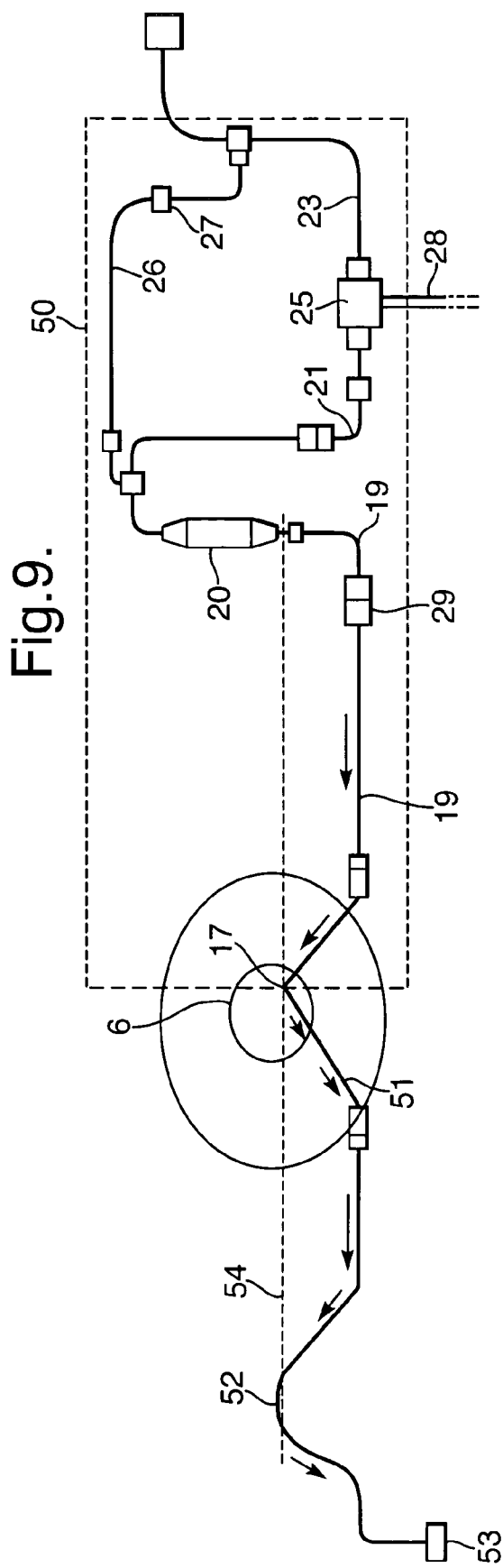
FIG. 9 is a schematic illustration of a bearing arrangement in accordance with the present invention in context with an engine bearing and scavenge pipe.

FIG. 9 provides a contextual schematic illustration of the present bearing arrangement. Common reference nomenclature with earlier drawings has been used for clarity. Thus, the bearing 6 (FIG. 1) is located within a casing and fed with oil in accordance with the bearing arrangement described above. Thus oil flows in the direction of the arrowheads depicted in FIG. 9. The arrangement described with regard to FIGS. 2 to 8 is generally shown in FIG. 9 in the schematic section highlighted by broken line box 50 and, as indicated above, consistent reference nomenclature has been used. In such circumstances it will be noted that oil flow through the outlet 17 into the bearing 6 during normal use in order to lubricate that bearing 6. A scavenge pipe 51 scavenges oil from the bearing 6 over a weir 52 to return to a scavenge pump/gearbox 53. As indicated, it is retaining oil in this scavenge pipe 51 in order to inhibit coking which is a benefit of the present invention. The accumulator 20 is rendered sufficiently large to fill the scavenge pipe 51 for a period after engine shutdown. Thus, the siphoning effect of the scavenge pump/gearbox 53 continuing to draw oil in the direction of arrowheads from the bearing in order to leave the scavenge pipe with only a thin film of oil on its inner surface, which through high temperatures may coke is inhibited by the additional continued flow from the accumulator 20 after engine shutdown. In short, ideally oil level within the engine should remain as near to the weir height 54 as possible. The accumulator 20 allows the excess oil within that accumulator 22 to act as a ballast to retain oil level as near to the weir height 54 as possible during the initial shut down period when the engine and scavenge pipe oil are hot.

It will be appreciated that continued coking episodes and deposits in the scavenge pipe may necessitate complex scavenge pipe repairs if that pipe should become blocked or significantly curtailed in diameter.

I claim:

1. A gas turbine engine comprising a lubrication arrangement for a bearing, the arrangement comprising:
    a flow pipe having a main lubrication flow,
    a feed flow pipe having an outlet for presentation of a forced lubricant fluid flow, or scavenging of lubricant fluid;
    a drain restrictor comprising an anti-siphon tube associated with the flow pipe and the feed flow pipe;
    a supply pipe is connected to the flow pipe, the supply pipe including a manifold, wherein
    the supply pipe is connected to a first end of the anti-siphon tube on a first side of the manifold and is connected to a second end of the anti-siphon tube on a second side of the manifold;
    the anti-siphon tube being positioned to prevent siphoning and/or drawback of fluid from the feed flow pipe, and
    the feed flow pipe being positioned gravitationally below the outlet to provide a lubricant fluid retainer for the outlet of the feed flow pipe upon removal of forcing pressure for the forced lubricant fluid flow in the event of engine shut down.

2. The arrangement of claim 1, wherein the feed flow pipe comprises a pipe restrictor.

3. The arrangement of claim 1, wherein the lubricant fluid retainer comprises a loop whereby lubricant is retained in balance across an arc of the loop to the outlet.

4. The arrangement of claim 1, wherein the supply pipe is arranged to supply lubricant fluid with a fluid head above a height of the outlet.

5. The arrangement of claim 4, wherein the anti-siphon tube is coupled to the supply pipe at a supply height for the feed flow pipe.

6. A lubrication system for a bearing comprising the lubrication arrangement of claim 1 associated with lubrication flow pipes for other bearings whereby a pump provides the forced lubricant fluid flow and the drain restrictor acts between the feed flow pipe and other pipes for the other bearings to isolate the feed flow pipe from siphon drainage.

7. A gas turbine engine comprising a lubrication arrangement for a bearing, the arrangement comprising:
    a flow pipe having a main lubrication flow,
    a feed flow pipe having an outlet for presentation of a forced lubricant fluid flow, or scavenging of lubricant fluid; and
    a drain restrictor comprising an anti-siphon tube associated with the flow pipe and the feed flow pipe;
    a supply pipe connected to the flow pipe, the supply pipe including a manifold, wherein
    the supply pipe is connected to a first end of the anti-siphon tube on a first side of the manifold and is connected to a second end of the anti-siphon tube on a second side of the manifold;
    the anti-siphon tube being positioned to prevent siphoning and/or drawback of fluid from the feed flow pipe,
    the feed flow pipe being positioned gravitationally below the outlet to provide a lubricant fluid retainer for the outlet of the feed flow pipe upon removal of forcing pressure for the forced lubricant fluid flow, and
    the drain restrictor further comprises an accumulator in the feed flow pipe to provide an additional lubricant fluid reserve and the accumulator is positioned to provide a fluid head for the lubricant fluid retainer in the event of engine shut down.

8. The arrangement of claim 7, wherein the accumulator is located above a height of the outlet.

9. The arrangement of claim 7, wherein the accumulator sustains the forced lubricant fluid flow after removal of any engine pressurizing means for the forced lubricant fluid flow.

10. The arrangement of claim 7 wherein the anti-siphon tube is coupled to an inlet of the accumulator and comprises a pipe restrictor to prevent lubricant fluid drainage through the anti-siphon tube while allowing air to enter the accumulator.

11. The arrangement of claim 10, wherein the supply pipe is arranged to supply lubricant fluid with a fluid head above a height of the outlet, the anti-siphon tube being coupled to the supply pipe at a supply height for the feed flow pipe.

* * * * *